(12) United States Patent
Bylander et al.

(10) Patent No.: US 9,897,763 B2
(45) Date of Patent: *Feb. 20, 2018

(54) TRANSCEIVER INTERFACE HAVING STAGGERED CLEAVE POSITIONS

(71) Applicant: 3M INNOVATIVE PROPERTIES COMPANY, St. Paul, MN (US)

(72) Inventors: James R. Bylander, Cedar Park, TX (US); Ding Wang, Austin, TX (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/411,209

(22) Filed: Jan. 20, 2017

(65) Prior Publication Data

US 2017/0131480 A1 May 11, 2017

Related U.S. Application Data

(63) Continuation of application No. 15/130,125, filed on Apr. 15, 2016, now Pat. No. 9,588,301, which is a
(Continued)

(51) Int. Cl.
*G02B 6/32* (2006.01)
*G02B 6/36* (2006.01)
(Continued)

(52) U.S. Cl.
CPC .......... *G02B 6/3822* (2013.01); *G02B 6/262* (2013.01); *G02B 6/264* (2013.01); *G02B 6/32* (2013.01);
(Continued)

(58) Field of Classification Search
CPC .......... G02B 6/26; G02B 6/262; G02B 6/264; G02B 6/32; G02B 6/322; G02B 6/325;
(Continued)

(56) References Cited

U.S. PATENT DOCUMENTS 1,620,774 A 3/1927 Maurer
4,078,852 A 3/1978 Lebduska
(Continued)

FOREIGN PATENT DOCUMENTS

DE 29811449 1/2003
EP 2 031 427 3/2009
(Continued)

OTHER PUBLICATIONS

PCT International Search Report from PCT/US2012/054781 dated Nov. 15, 2012, 4 pages.

*Primary Examiner* — Akm Enayet Ullah
*Assistant Examiner* — Michael Mooney
(74) *Attorney, Agent, or Firm* — Clifton F. Richardson

(57) ABSTRACT

The disclosure generally relates to sets of optical waveguides such as optical fiber ribbons, and fiber optic connectors useful for connecting multiple optical fibers such as in optical fiber ribbon cables. In particular, the disclosure provides an efficient, compact, and reliable optical fiber connector that incorporates an optically transmissive substrate combining the features of optical fiber alignment, along with redirecting and shaping of the optical beam.

19 Claims, 8 Drawing Sheets

Related U.S. Application Data continuation of application No. 14/236,353, filed as application No. PCT/US2012/054781 on Sep. 12, 2012, now Pat. No. 9,354,397.

(60) Provisional application No. 61/539,080, filed on Sep. 26, 2011, provisional application No. 61/539,070, filed on Sep. 26, 2011.

(51) Int. Cl.
　　*G02B 6/38* 　　(2006.01)
　　*G02B 6/26* 　　(2006.01)
　　*G02B 6/42* 　　(2006.01)

(52) U.S. Cl.
　　CPC .............. *G02B 6/322* (2013.01); *G02B 6/325* (2013.01); *G02B 6/3636* (2013.01); *G02B 6/38* (2013.01); *G02B 6/3829* (2013.01); *G02B 6/3839* (2013.01); *G02B 6/3885* (2013.01); *G02B 6/4206* (2013.01); *G02B 6/4208* (2013.01); *G02B 6/4214* (2013.01); *G02B 6/4246* (2013.01)

(58) Field of Classification Search
　　CPC .. G02B 6/3636; G02B 6/3652; G02B 6/3653; G02B 6/3672; G02B 6/368; G02B 6/38; G02B 6/3822; G02B 6/3829; G02B 6/3839; G02B 6/3885; G02B 6/4206; G02B 6/4207; G02B 6/4208; G02B 6/4214; G02B 6/4246; G02B 6/4249; G02B 6/4292
　　USPC .......................................... 385/32–33, 49–94
　　See application file for complete search history.

(56) References Cited

U.S. PATENT DOCUMENTS

| | | | |
|---|---|---|---|
| 4,421,383 A | 12/1983 | Carlsen | |
| 4,666,238 A | 5/1987 | Borsuk et al. | |
| 4,701,011 A | 10/1987 | Emkey et al. | |
| 5,163,113 A | 11/1992 | Melman | |
| 5,390,271 A | 2/1995 | Priest | |
| 5,682,449 A | 10/1997 | Taira-Griffin | |
| 6,422,761 B1 | 7/2002 | Naghski et al. | |
| 6,904,197 B2 | 6/2005 | Bhagavatula et al. | |
| 7,033,084 B2 | 4/2006 | Lappohn | |
| 7,189,007 B2 | 3/2007 | Imanbayev et al. | |
| 7,197,224 B2 | 3/2007 | Rolston et al. | |
| 7,212,698 B2 | 5/2007 | Bapst et al. | |
| 7,315,669 B2 | 1/2008 | Ohtorii | |
| 7,399,125 B1 | 7/2008 | Whaley et al. | |
| 7,522,807 B2 | 4/2009 | Rolston et al. | |
| 7,648,287 B2 | 1/2010 | Epitaux et al. | |
| 7,991,248 B2 * | 8/2011 | Matsuoka | G02B 6/12002 385/129 |
| 8,611,716 B2 * | 12/2013 | DeMeritt | G02B 6/4214 385/130 |
| 9,134,494 B2 | 9/2015 | Wang et al. | |
| 9,354,397 B2 * | 5/2016 | Bylander | G02B 6/4214 |
| 9,435,971 B2 | 9/2016 | Wang et al. | |
| 9,588,301 B2 * | 3/2017 | Bylander | G02B 6/4214 |
| 2003/0138223 A1 | 7/2003 | Sasaki et al. | |
| 2006/0210222 A1 | 9/2006 | Watte et al. | |
| 2007/0122085 A1 | 5/2007 | Takahashi | |
| 2007/0183707 A1 * | 8/2007 | Umezawa | G02B 6/4292 385/14 |
| 2009/0107613 A1 | 4/2009 | Cosentino | |
| 2009/0290836 A1 | 11/2009 | Lee et al. | |
| 2010/0215313 A1 | 8/2010 | Matsuoka et al. | |
| 2011/0064358 A1 | 3/2011 | Nishimura | |
| 2012/0099820 A1 * | 4/2012 | Rolston | G02B 6/4249 385/59 |
| 2016/0341902 A1 | 11/2016 | Wang et al. | |

FOREIGN PATENT DOCUMENTS

| | | |
|---|---|---|
| JP | 2006-259682 | 9/2006 |
| JP | 2009-300824 | 12/2009 |
| JP | 2011-150155 | 8/2011 |
| JP | 2011-203527 | 10/2011 |
| WO | WO 2011-111542 | 9/2011 |

* cited by examiner

TRANSCEIVER INTERFACE HAVING STAGGERED CLEAVE POSITIONS

TECHNICAL FIELD

The present invention relates to an optical connector for connecting sets of optical waveguides such as optical fiber ribbons.

BACKGROUND

Optical fiber connectors are used to connect optical fibers in a variety of applications including: the telecommunications network, local area networks, data center links, and for internal links in high performance computers. These connectors can be grouped into single fiber and multiple fiber designs and also grouped by the type of contact. Common contact methods include: physical contact wherein the mating fiber tips are polished to a smooth finish and pressed together; index matched, wherein a compliant material with an index of refraction that is matched to the core of the fiber fills a small gap between the mated fibers' tips; and air gap connectors, wherein the light passes through a small air gap between the two fiber tips. With each of these contact methods a small bit of dust tips of the mated fibers can greatly increase the light loss.

Another type of optical connector is referred to as an expanded beam connector. This type of connector allows the light beam in the source connector to exit the fiber core and diverge within the connector for a short distance before the light is collimated to form a beam with a diameter substantially greater than the core. In the receiving connector the beam is then focused back to its original diameter on the tip of the receiving fiber. This type of connector is less sensitive to dust and other forms of contamination.

The optical cables used in many applications make use of fiber ribbons. These ribbons are comprised of a set of coated fibers joined together in a line (typically 4, 8 or 12 fibers in a line). The individual glass fibers with their protective coatings are typically 250 microns in diameter and the ribbons typically have a fiber to fiber pitch of 250 microns. This 250 micron spacing has also been used in optical transceivers with a variety of designs spacing the active optical devices at the same 250 micron spacing.

Currently available expanded beam multiple fiber connectors typically limit the beam diameter to 250 microns to match the ribbon pitch. In order to achieve a beam diameter greater than the fiber pitch, current connectors require the fiber ribbon to be manually split into single fibers before mounting the fibers on the connector.

In general, single fiber optical connectors include a precision cylindrical ferrule for aligning and contacting optical fiber end faces with each other. The optical fiber is secured in the central bore of the ferrule so that the fiber's optical core is centered on the ferrule axis. The fiber tip is then polished to allow physical contact of the fiber core. Two such ferrules can then be aligned with each other using an alignment sleeve with the polished fiber tips pressed against each other to achieve a physical contact optical connection from one fiber to another. Physical contact optical connectors are widely used.

Multiple fiber connectors often use a multiple fiber ferrule such as the MT ferrule to provide optical coupling from the source fibers to the receive fibers. The MT ferrule guides the fibers in an array of molded bores to which the fibers are typically bonded. Each ferrule has two additional bores in which guide pins are located to align the ferrules to each other and thus align the mated fibers.

A variety of other methods have also been used to make fiber to fiber connections. Included are V-groove alignment systems such as found in Volition™ optical fiber cable connectors, and bare fiber alignment in an array of precise bores. Some connecting concepts such as described in, for example, U.S. Pat. Nos. 4,078,852; 4,421,383, and 7,033,084 make use of lenses and/or reflecting surfaces in optical fiber connections. Each of these connecting concepts describes single purpose connection systems, such as an in line connector or a right angle connector.

It would be advantageous to provide an expanded beam connector that can terminate fiber ribbons without separating the fibers and also provide a beam with a diameter greater than the fiber-to-fiber pitch.

SUMMARY

The disclosure generally relates to sets of optical waveguides such as optical fiber ribbons, and fiber optic connectors useful for connecting multiple optical fibers such as in optical fiber ribbon cables. In particular, the disclosure provides an efficient, compact, and reliable optical waveguide connector that incorporates a optically transmissive substrate combining the features of optical waveguide alignment, along with redirecting and shaping of the optical beam.

In one aspect, the present disclosure provides an optical construction that includes: an optically transmissive substrate having: a first major surface including a plurality of waveguide alignment features; an opposing second major surface including a plurality of microlenses staggered relative to one another; and a plurality of optical waveguides with angle cleaved end faces disposed adjacent the first major surface. The angle cleaved end faces are staggered relative to one another, each angle cleaved end face of an optical waveguide in the plurality of optical waveguides corresponding to a different microlens and being oriented so that light exiting each optical waveguide is directed by the angle cleaved end face to the corresponding microlens through the substrate. In another aspect, the present disclosure also provides an optical connector including the optical construction. In still another aspect, the present disclosure also provides a transceiver including the optical construction.

In another aspect, the present disclosure provides an optical construction that includes: a first major surface having a first plurality of waveguide alignment features; a first plurality of optical waveguides with angle cleaved end faces disposed adjacent the first major surface, the angle cleaved end faces being staggered relative to one another; a second major surface opposite the first major surface and comprising a second plurality of waveguide alignment features; and a second plurality of optical waveguides with angle cleaved end faces disposed in adjacent the second major surface, the angle cleaved end faces being staggered relative to one another. Each optical waveguide in the first plurality of optical waveguides corresponds to a different optical waveguide in the second plurality of optical waveguides, the angle cleaved faces of corresponding optical waveguides being so oriented that light exiting one optical waveguide enters the corresponding optical waveguide. In another aspect, the present disclosure also provides an optical connector including the optical construction. In still another aspect, the present disclosure also provides a transceiver including the optical construction.

In yet another aspect, the present disclosure provides an optical construction that includes: an optically transmissive substrate having a first major side including a first floor surface; a first staircase formed on the first floor surface and including at least a first step comprising a first tread; a second major side opposite the first major side and having a second floor surface; a second staircase formed on the second floor surface and including at least a first step having a first tread. The optically transmissive substrate further includes a first plurality of staggered microlenses disposed on the second floor surface and forming rows of microlenses; a second plurality of staggered microlenses disposed on the first tread of the second staircase and forming rows of microlenses, wherein the substrate, the first and second staircases and the microlenses form a unitary construction. The optical construction further includes a first plurality of optical waveguides with angle cleaved end faces disposed on the first floor surface, the angle cleaved end faces being staggered relative to one another; and a second plurality of optical waveguides with angle cleaved end faces disposed on the first tread of the first staircase, the angle cleaved end faces being staggered relative to one another, wherein each angle cleaved end face of an optical waveguide in the first and the second plurality of optical waveguides corresponds to a different microlens so that light exiting each optical waveguide is directed by the angle cleaved end face to the corresponding microlens through the substrate. In another aspect, the present disclosure also provides an optical connector including the optical construction. In still another aspect, the present disclosure also provides a transceiver including the optical construction.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1A:
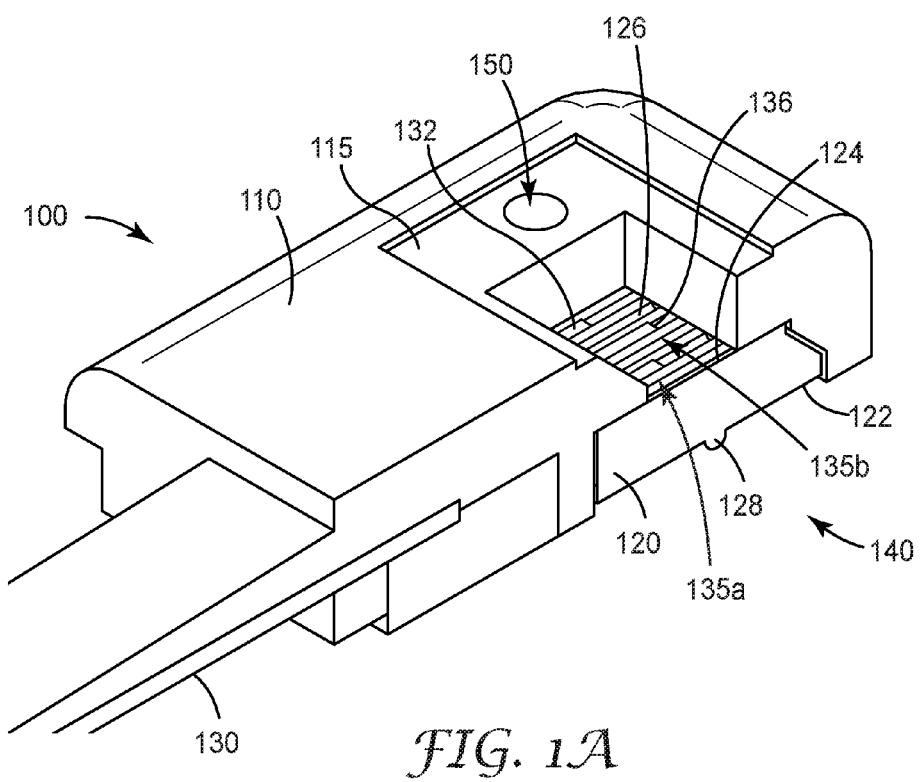
FIG. 1A shows a cut-away perspective view of a fiber optic connector.

This application is related to U.S. Pat. No. 9,207,413, which is incorporated by reference.

The present disclosure relates sets of optical waveguides such as optical fiber ribbons, and fiber optic connectors useful for connecting multiple optical fibers such as in optical fiber ribbon cables. The description that follows is directed toward connections of optical fibers and optical fiber ribbon cables; however, it is to be understood that the present disclosure is similarly directed to connections of optical waveguides including, for example, planar optical waveguides that can be fabricated from polymeric materials or glasses.

There are a number of optical fiber connector features that users of optical fibers desire, which are not found in currently available products. These features include low cost, robust performance against contamination, easy cleaning, compact designs, and the ability to rapidly and repeatedly connect multiple optical fibers with a single connector. A rapidly growing application for high capacity interconnections is between equipment racks in data centers where data rates of 10 Gb/s are common, and link lengths are relatively short (typically a few to 100 meters). In such applications, multiple single fiber connectors are often ganged together. Accordingly, described herein is a multiple fiber connecting technique and article which can significantly reduce the cost of multi-fiber connecting.

In both single fiber and multi-fiber device interfaces it is often desirable to maintain a low profile interface. This is often accomplished by routing the fiber parallel to the circuit board and using a reflective surface to turn the light so that the beam is perpendicular to the board at the chip interface. It is also common to make use of small lenses to improve the coupling efficiency between the device and the fiber. In the case of ribbon fiber interfaces, these lenses have a center to center distance of 250 um to match with the spacing in the ribbon. Often an MT ferrule is also included as part of the transceiver package with the ferrule's alignment pins being used to align the fibers to the lenses.

In one particular embodiment, the present disclosure provides a general purpose connecting element for multi-fiber optical connectors that include an optically transmissive substrate that makes use of angled reflecting surfaces and a microlens array to redirect and focus or collimate the optical beams. The redirected beams emerge from the element perpendicular to a planar mating surface. The microlens elements can be located in a pocket and can be slightly recessed from the mating surface. The connecting elements also include mechanical features to facilitate alignment of the microlens arrays of the two mated parts. In one particular embodiment, the reflecting surfaces may be cleaved end surfaces that can be aligned at an angle to the optical axis of the optical fiber. In some cases, the reflective surface may be coated with a reflecting material such as a metal or metal alloy to redirect the light. In some cases, the reflective surface may instead enable Total Internal Reflection (TIR) to facilitate redirecting the light.

The optically transmissive substrate can be encased in a connector housing that can provide support for the optical cable, ensure alignment of interlocking components of the connector element, and provide protection from the environment. Such connector housings are well known in the art, and can include, for example, alignment holes, matching alignment pins, and the like. The same connecting element can be used in a variety of connecting configurations. It can also be used to interface optical fibers to optical devices such as VCSELs and photodetectors using a board mounted alignment ring. It is to be understood that although the disclosure provided herein describes light travelling in one direction through the fiber and the connector, one of skill in the art should realize that light could also travel in the opposite direction through the connector, or could be bi-directional.

The relatively simple design used for both the optically transmissive substrate and the connector housing, eliminates the use of fine core pins such as in an MT ferrule molding, and as a result, the cost and complexity of the molded, cast, or machined part is reduced. Furthermore, a general purpose connecting element described herein can be used in a variety of applications, thereby allowing both development costs and manufacturing costs to be spread across higher volume, decreasing the cost per part. Still further, the use of an expanded optical beam from focusing or collimating microlenses can also provide for improved resistance to transmission losses due to dirt or other impurities.

In one particular embodiment, the unique interface defined herein can be used for making internal links within high performance computers, servers, or routers. Additional applications in mating to optical back planes can also be envisioned. Some of the prominent features of the connecting elements can include: a molded (or cast, or machined) component having a generally planar mating surface, and a recessed area (pocket) within the mating surface; convex microlens features located on the floor of the pocket with the apex of these microlens features being within the pocket volume so that when two elements are mated with their mating surfaces in contact, a small gap exists between the microlens features; optical fiber alignment features useful to align the optical fibers axes generally within about 15 degrees of parallel to the mating surface; and reflecting surfaces to redirect the optical beam from each fiber so that they are perpendicular to the mating surface. Each optical beam is centered over one of the microlens features; and mechanical alignment features facilitate the alignment of two connecting elements so that their mating surfaces are in contact and their microlenses are aligned.

In one particular embodiment, the microlens features may collimate the light beam from the fiber. Generally, collimated light can be useful for making fiber-to-fiber connections, since the light beam is generally expanded upon collimation, which makes the connection less susceptible to contamination by foreign material such as dust. In one particular embodiment, the microlens features may instead focus the beam so as to create a beam "waist" in the plane of the mating surface. Generally, focused beams can be useful for making fiber-to-circuit connections such as to a sensor or other active device disposed on a circuit board, since the light beam can be concentrated to a smaller region for greater sensitivity. In some cases, particularly for optical fiber-to-fiber connections, collimation of the light beam may be preferred, since the collimated light beams are more robust against dirt and other contamination, and also provide for greater alignment tolerances.

In one particular embodiment, the optical fibers can be aligned using waveguide alignment features, such as within molded vee-groove features in the optically transmissive substrate, with the vee-grooves being parallel to the mating surface; however, vee-grooves are not required for alignment in all cases. As described herein, optional parallel vee-grooves are included, but it is to be understood that other techniques for alignment and securing of the optical fibers would also be acceptable. Furthermore, vee-grooved alignment may not be suitable in some cases and other techniques may be preferred, for example, when the optical waveguide is a planar optical waveguide. In some cases, the alignment of the optical waveguides and/or optical fibers can instead be accomplished by any of the techniques known to one of skill in the art of optical alignment using any suitable waveguide alignment feature.

A variety of mechanical feature sets may be used to align a pair of connecting elements. One feature set includes a pair of precisely positioned holes into which alignment pins are placed, similar to the alignment technique used for MT ferrules. In one particular embodiment, if the holes diameters and locations are similar to that of the MT connector, then one of the connecting elements described herein could (with an appropriate set of microlenses) intermate with an MT ferrule.

Coupling the light from optical fiber to optical fiber, from semiconductor light sources to optical fibers, and the related coupling light from optical fibers to photodetector chips, has been done in a wide variety of ways. Achieving the desired low loss and low cost has been challenging. This is especially so when the fibers are grouped into industry standard ribbons. These ribbons contain a number of coated fibers (typical numbers are 8 or 12) having an outside diameter of about 250 um. The fibers are then laminated between a pair of thin polymer films to make a flat ribbon. Another technique for fabricating ribbons is to use an extrusion process wherein the individual coated fibers are guided through an extrusion die with a polymeric matrix material.

The present disclosure provides an improvement on previous multifiber interfaces, including transceiver interfaces, by providing a fiber ribbon that includes individual fibers cleaved at more than one length to allow greater space between optical devices reducing electrical interference and also allowing the use of lenses having a larger diameter to allow more effective optical coupling. In one particular embodiment, the individual fibers can be cleaved at more than one length that results in a staggered pattern of the cleaved ends. The staggered pattern can include several rows of fiber ends, each row including fibers cleaved at the same length, whereas adjacent rows include adjacent fibers that are cleaved at a different length.

The present disclosure relates in part to optical transceiver interfaces used in communication and computer networks for both external and internal links. The transceivers may be located on a motherboard, daughter board, blade, or may be integrated into the ends of an active optical cable.

With the ever increasing data rates, it becomes increasingly difficult to package sensitive photodetectors close to the higher power semiconductor lasers without electromagnetic interference problems. Furthermore, as bit rates increase the beam divergence of vertical cavity surface emitting lasers (VCSELs) increases. These issues make it desirable to increase the device spacing and the lens diameter.

In some cases, to minimize Fresnel loss, it can be desirable to have only a single air gap between the devices and the fiber cores. To achieve this, the present disclosure provides that the fibers can be adhesively attached to the optically transmissive substrate along their bottom side with an index matching adhesive.

Given this configuration and the numerical aperture of the fiber, a 500 um lens allows the lens block to be manufactured without extremely fine sections which would be difficult to mold. Cleave patterns other than the two rows shown here are also possible and would enable even larger lens diameter and device spacing.

FIG. 1A shows a cut-away perspective view of a fiber optic connector 100 according to one aspect of the disclosure. Fiber optic connector 100 includes a connector housing 110 having an optional cover support 115, an optional cover (not shown) that fits within the optional cover support 115 to protect the optical components of the fiber optic connector 100 from the environment, and an alignment feature 150. An optically transmissive substrate 120 having a plurality of optional parallel vee-grooves 126 for accepting individual optical fibers 132 from an optical ribbon cable 130 is secured within connector housing 110. The individual optical fibers 132 each include a cleaved end 136 disposed in a staggered orientation forming at least a first optical fiber row 135a and a second optical fiber row 135b. It is to be understood that any desired number of optical fiber rows can staggered relative to each other, as described elsewhere. In operation, each of the cleaved ends 136 associated with each of the individual optical fibers 132 re-direct light through optically transmissive substrate 120 and out through a microlens 128 disposed on lower surface 122. The microlenses 128 can be disposed in a cavity 140 such that the lens surface is indented from the bottom of the connector housing 110. The cleaved ends 136 can be laser cleaved optical fibers that forms an oblique angle with the axis of the fiber, as described elsewhere. In some cases, the cleaved optical fibers can be coated with a reflector such as a metal or metal alloy. In some cases, the cleaved optical fibers can instead re-direct light by total internal reflection (TIR).

Optically transmissive substrate 120 can be fabricated from any suitably transparent and dimensionally stable material including, for example, polymers such as a polyimide. In one particular embodiment, optically transmissive substrate 120 can be fabricated from a dimensionally stable transparent polyimide material such as, for example, Ultem 1010 Polyetherimide, available from SABIC Innovative Plastics, Pittsfield Mass. In some cases, the individual optical fibers 132 can be adhesively secured in the optional parallel vee-grooves 126. In one particular embodiment, an index matching gel or adhesive may be inserted between the optically transmissive substrate 120 and the individual optical fibers 132. By eliminating any air gap in this area, Fresnel losses may be greatly reduced.

Figure 1B:
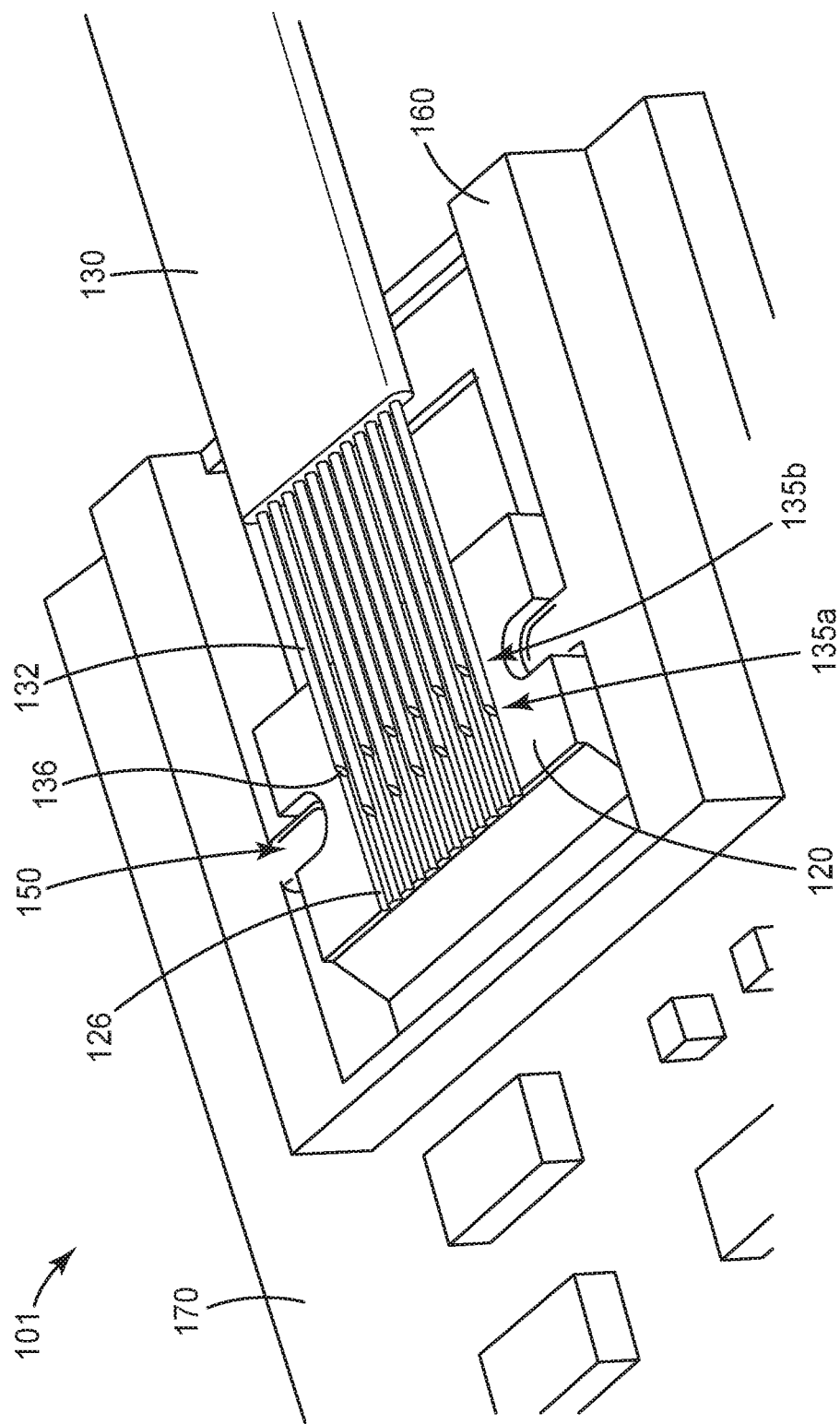
FIG. 1B shows a cut-away perspective view of a fiber optic connector.

FIG. 1B shows a cut-away perspective view of a fiber optic connector 101 attached to a circuit board 170. The housing components shown in FIG. 1A have been removed in FIG. 1B to more clearly show the relationship of the optical ribbon cable 130, the individual optical fibers 132, the cleaved ends 136, and the optional vee-grooves of the optically transmissive substrate 120. As described elsewhere, each of the first row 135a and second row 135b of cleaved ends 136 of optical fibers 132 are associated with a first row and a second row of microlenses (not shown). The microlenses (and thus the cleaved ends 136) can be aligned by alignment features 150 and alignment ring 160, to any desired optical device (not shown, but located under optically transmissive substrate 120) positioned on circuit board 170.

Figure 1C:
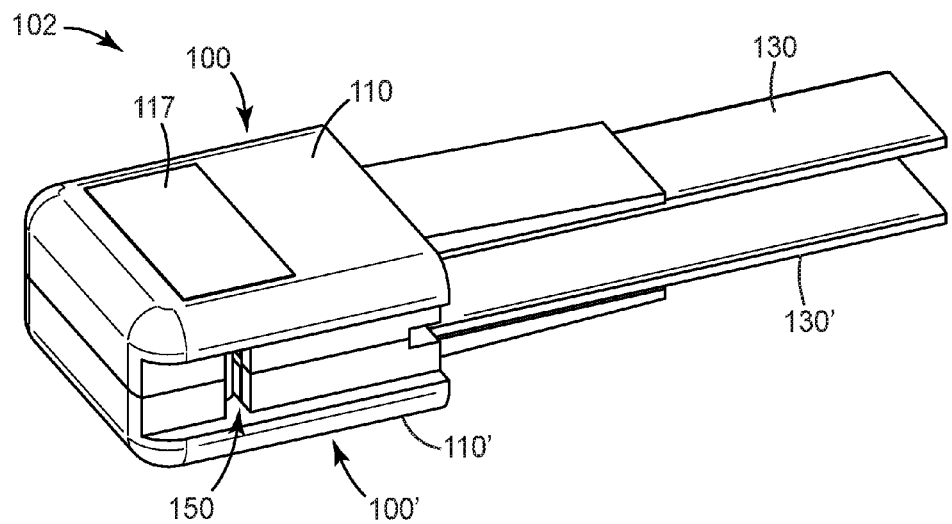
FIG. 1C shows a perspective view of a fiber optic connector.

FIG. 1C shows a perspective view of the fiber optic connector 100 of FIG. 1A connected to a second fiber optic connector 100'. Second fiber optic connector 100' can be identical to the fiber optic connector 100, and forms an optical connection 102, as described elsewhere. Optional cover 117 is disposed optional cover support 115 (shown in FIG. 1A) to protect the optical components of the fiber optic connector 100 from the environment. Alignment features 150 serve to ensure that light from optical ribbon cable 130 and second optical ribbon cable 130' are coupled efficiently, with a minimum of losses.

Figure 2A:
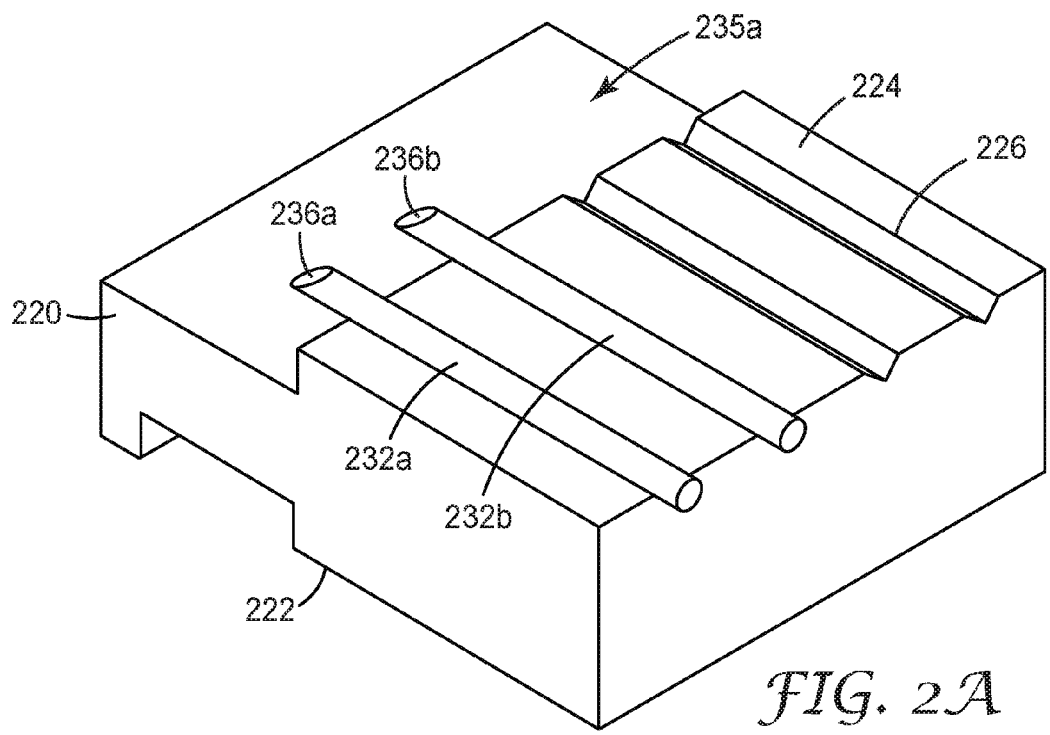
FIG. 2A shows a top perspective schematic view of an optically transmissive substrate.

FIG. 2A shows a top perspective schematic view of an optically transmissive substrate 220, according to one aspect of the disclosure. Optically transmissive substrate 220 includes a first surface 224 having a plurality of optional parallel vee-grooves 226, and an opposing second surface 222. A plurality of input optical fibers (two are shown as first input optical fiber 232a and a second input optical fiber 232b) are positioned along optional parallel vee-grooves 226, and may be adhered to the optional parallel vee-groove 226, as described elsewhere. Each of the input optical fibers 232a, 232b, are cleaved at an oblique angle to the axis of the input optical fibers 232a, 232b, forming a first cleaved end 236a and a second cleaved end 236b within a first cleaved end row 235a, such that injected light is re-directed into the optically transmissive substrate 220. In some cases, the light can be re-directed at an angle perpendicular to the axis of the input optical fibers 232a, 232b.

Figure 2B:
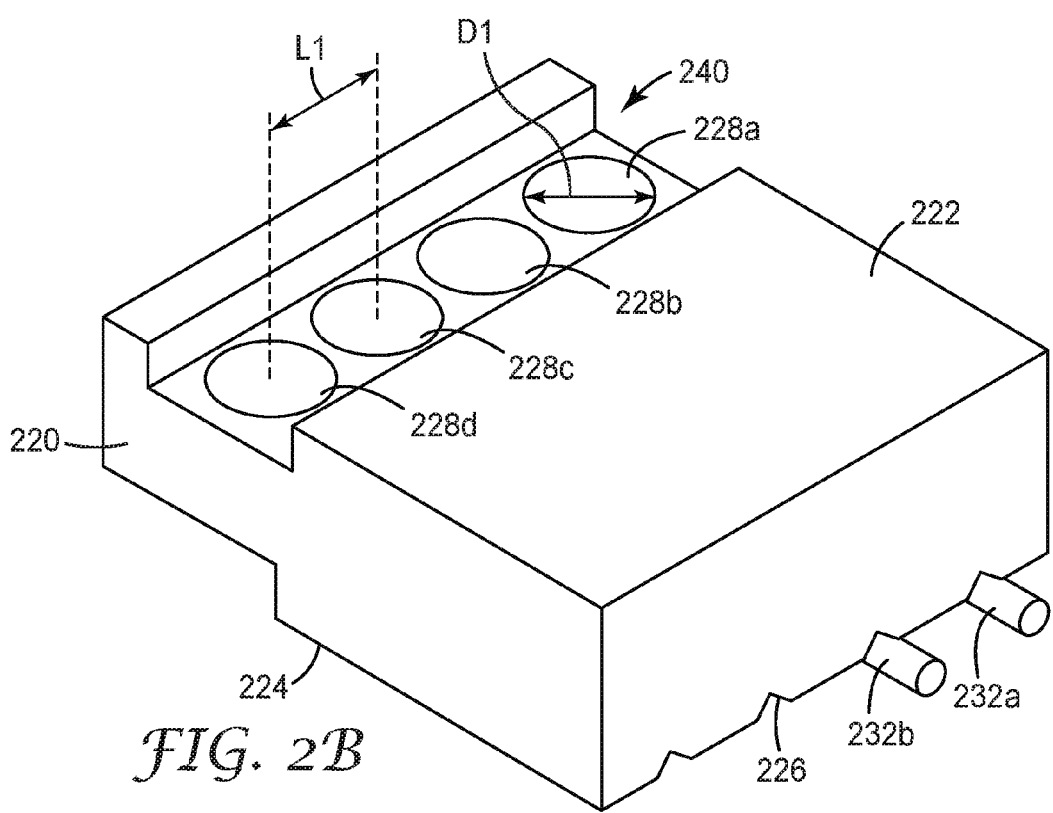
FIG. 2B shows a bottom perspective schematic view of an optically transmissive substrate.

FIG. 2B shows a bottom perspective schematic view of the optically transmissive substrate 220 of FIG. 2A. Optically transmissive substrate 220 includes the first surface 224 and the opposing second surface 222 having a plurality of microlenses 228a, 228b, 228c, 228d, that are disposed within a microlens pocket 240. Each of the plurality of microlenses 228a, 228b, 228c, 228d are aligned with a cleaved end 236a, 236b, in first cleaved end row 235a described above, and are disposed to receive re-directed light from the respective optical fiber 232a, 232b. Each of the microlenses have a microlens diameter D1, and are disposed within microlens pocket 240 with a center-to-center spacing L1. The center-to-center spacing L1 typically is no greater than the spacing between adjacent optical fibers, and results in a restriction on the maximum microlens diameter D1 that can be utilized in the connector, as described elsewhere. The depth of microlens pocket 240 serves to keep each of the microlenses below the level of opposing second surface 222. It is to be understood that optically transmissive substrate 220 can include any desired number of optional parallel vee-grooves 226, cleaved ends 236a-236b, rows of cleaved ends 235a, microlenses 228a-228d, and input optical fibers 232a, 232b.

Figure 3A:
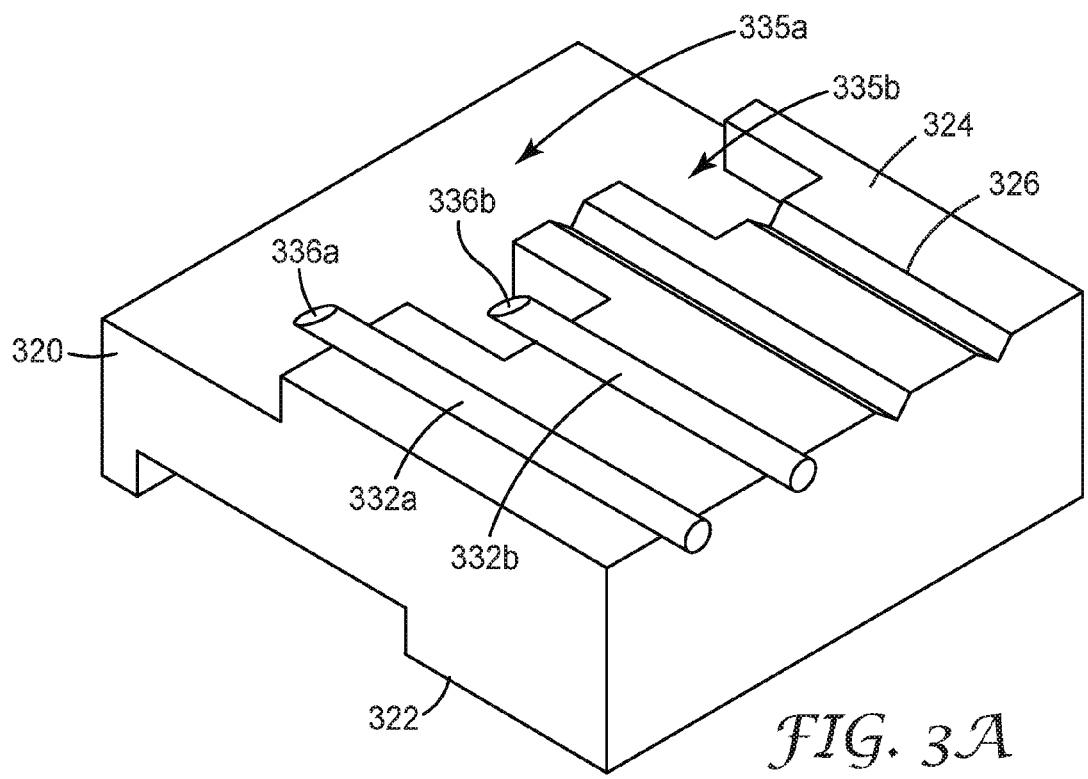
FIG. 3A shows a top perspective schematic view of an optically transmissive substrate.

FIG. 3A shows a top perspective schematic view of an optically transmissive substrate 320, according to one aspect of the disclosure. Optically transmissive substrate 320 includes a first surface 324 having a plurality of optional parallel vee-grooves 326 that are aligned with a plurality of light re-directing features 335a, 335b, 335c, 335d, and an opposing second surface 322. A plurality of input optical fibers (two are shown as first input optical fiber 332a and a second input optical fiber 332b) are positioned along optional parallel vee-grooves 326, and may be adhered to the optional parallel vee-groove 326, as described elsewhere. Each of the input optical fibers 332a, 332b, are cleaved at an oblique angle to the axis of the input optical fibers 332a, 332b, forming a first cleaved end 336a within a first cleaved end row 335a, and a second cleaved end 336b within a second cleaved end row 335b, such that injected light is re-directed into the optically transmissive substrate 320. In some cases, the light can be re-directed at an angle perpendicular to the axis of the input optical fibers 332a, 332b.

Figure 3B:
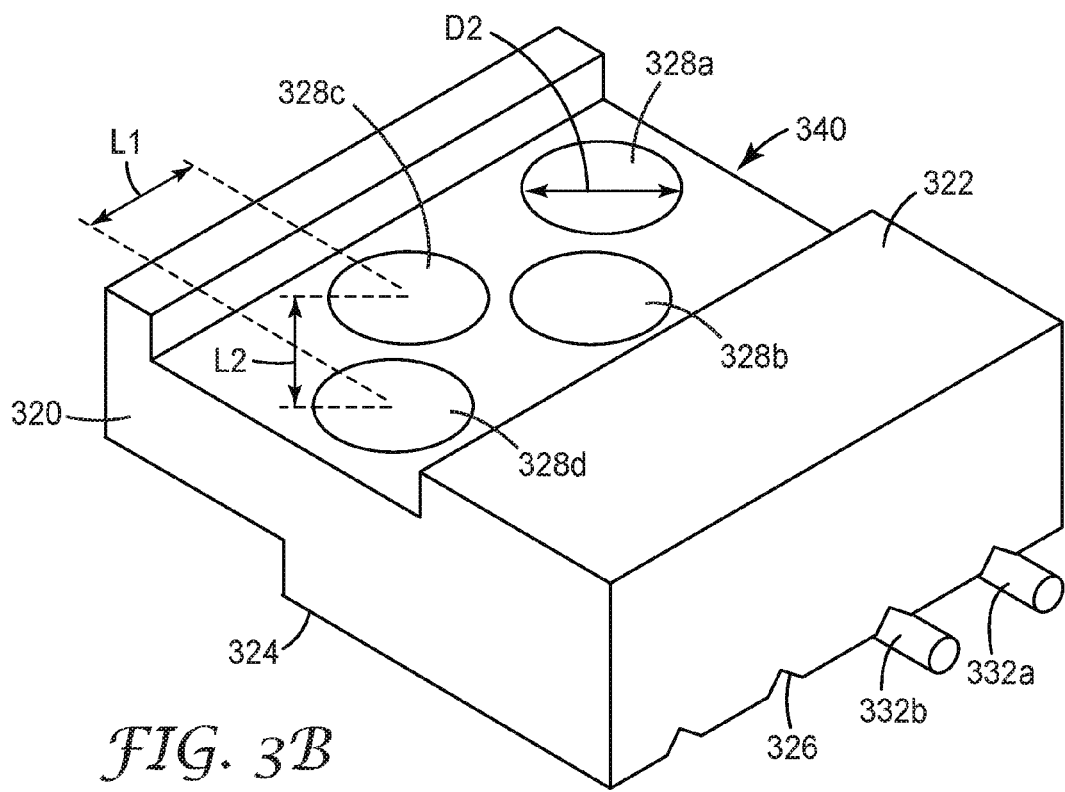
FIG. 3B shows a bottom perspective schematic view of an optically transmissive substrate.

FIG. 3B shows a bottom perspective schematic view of the optically transmissive substrate 320 of FIG. 3A. Optically transmissive substrate 320 includes the first surface 324 and the opposing second surface 322 having a plurality of staggered microlenses 328a, 328b, 328c, 328d, that are disposed within a microlens pocket 340. Each of the plurality of staggered microlenses 328a, 328b, 328c, 328d are aligned with a cleaved end 336a, 336b in a first and second row 335a, 335b, described above, and is disposed to receive light from the respective optical fibers 332a, 332b. Each of the staggered microlenses 328a, 328b, 328c, 328d have a staggered microlens diameter D2, and are disposed within microlens pocket 340 with a center-to-center spacing L1 corresponding to the separation of the optical fibers, and the center-to-center spacing L1 of adjacent microlenses 328a-328d can be the same as the center-to-center spacing L1 described with reference to FIG. 2B. However, each of the staggered microlenses 328a, 328b, 328c, 328d have a staggered spacing L2 corresponding to the separation of the microlenses, and the staggered spacing L2 is larger than the center-to-center spacing L1. As a result, the maximum microlens diameter D2 that can be utilized in the connector is greater for the staggered spacing L2 shown in FIG. 3B, as compared to the maximum microlens diameter D1 that can be utilized in the microlens spacing L1, as described elsewhere.

As a result of staggering the cleaved ends 336a, 336b, the plurality of staggered microlenses 328a, 328b, 328c, 328d, enable an increase in the microlens diameter D1 to the staggered microlens diameter D2. A larger staggered microlens diameter D2 is preferred. The depth of microlens pocket 340 serves to keep each of the microlenses below the level of opposing second surface 322. It is to be understood that optically transmissive substrate 320 can include any desired number of optional parallel vee-grooves 326, cleaved ends 336a-336b, rows of cleaved ends 335a, 335b, microlenses 328a-328d, number of rows of microlenses 328a-328d, number of microlenses 328a-328d in each row, and input optical fibers 332a, 332b.

In contrast with the embodiment shown in FIGS. 2A-2B, the microlens locations shown in FIG. 3B are not defined as a single row. In this case two rows of microlenses are shown with two microlenses in each row. When used with optical fiber ribbons having a 250 micron fiber-to-fiber spacing, this allows the microlenses to approach 500 microns in diameter. The use of 500 micron diameter collimating microlenses possible with the staggered fiber/microlens embodiment shown in FIGS. 3A-3B, allows an alignment tolerance that is less stringent than is required with 250 micron diameter microlenses possible with the embodiment shown in FIGS. 2A-2B, and much less stringent than needed for physical contact connectors using conventional MT ferrules. It is to be understood that any of the optical connectors described herein can include staggered cleaved ends and correspondingly staggered microlenses as described with reference to FIGS. 3A-3B, and it may be preferable to include the staggered configurations wherever possible. Generally, the described staggered microlens designs can enable an expanded-beam optical fiber connector that can be used for a ribbonized collection of fibers, wherein the optical beam diameter exiting the microlenses is greater than the fiber-to-fiber separation (that is, pitch) in the ribbon, and the fibers do not need to be singulated in order to accomplish the connection.

Figure 4:
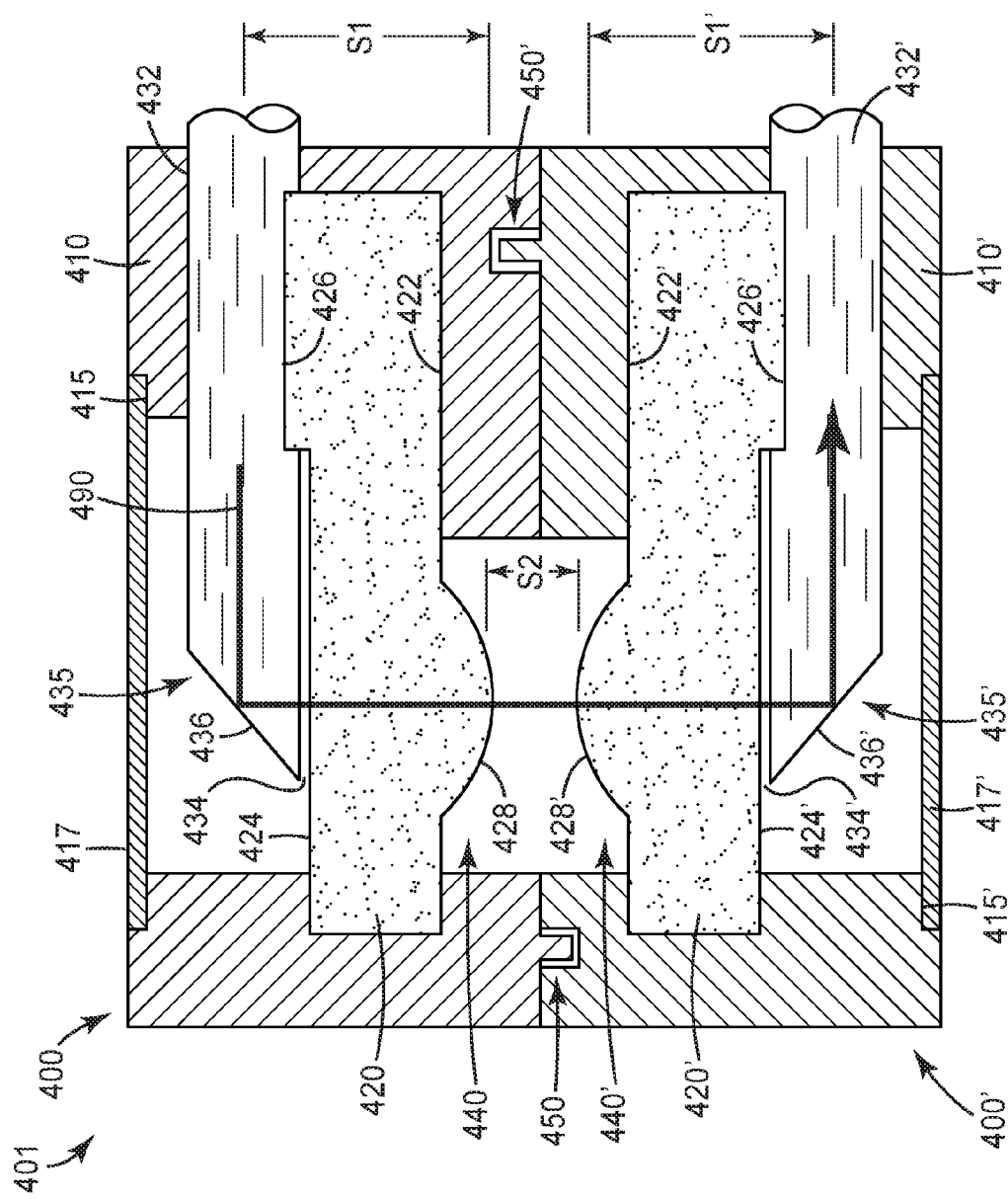
FIG. 4 shows a cross-sectional schematic view of an optical connection.

FIG. 4 shows a cross-sectional schematic view of an optical connection 401 that includes a first optical connector 400 connected to a second optical connector 400', according to one aspect of the disclosure. In FIG. 4, the cross-sectional view is near the optical axis (that is, center) of a pair of optical fibers in communication through the connector. In one particular embodiment, second optical connector 400' can be identical to the first optical connector 400, and forms the optical connection 401, similar to the optical connection 101 shown in FIG. 1B.

First optical connector 400 includes a first connector housing 410 and a first optically transmissive substrate 420 secured within the first connector housing 410. The first optically transmissive substrate 420 includes a first upper surface 424 and an opposite first lower surface 422. A first optical fiber 432 is secured within a first optional parallel vee-groove 426 on first upper surface 424, between the first optically transmissive substrate 420 and the first connector housing 410. The first connector housing 410 further includes an optional first cover support 415, and an optional first cover 417 that can serve to protect the components in the first optical connector 400.

First optical fiber 432 includes a first light re-directing feature 435 including a first cleaved end 436 of first optical fiber 432. First optical fiber 432 can be held in position and aligned by resting in the first optional parallel vee-groove 426, which can be directly molded into first optically transmissive substrate 420. First optical fiber 432 can be in direct contact with first upper surface 424 such that first gap 434 is eliminated. In some cases, an adhesive can be used to affix the first optical fiber 432 to the first optional parallel vee-groove 426 and an index-matching adhesive or gel can fill the first gap 434, if present.

First optically transmissive substrate 420 further includes a first microlens 428 disposed on the first lower surface 422, positioned such that a central light ray 490 travelling through the first optical fiber 432 that intercepts and is reflected from the first cleaved end 436, is directed toward the optical center of the first microlens 428. In one particular embodiment, shown in FIG. 4, first cleaved end 436 can be disposed such that central light ray 490 intercepts first cleaved end 436 at a reflection angle θr equal to about 45 degrees. In some cases, first cleaved end 436 can be a TIR surface. In some cases, first cleaved end 436 can instead be a mirrored reflective surface.

In a similar manner, second optical connector 400' includes a second connector housing 410' and a second optically transmissive substrate 420' secured within the second connector housing 410'. The second optically transmissive substrate 420' includes a second upper surface 424' and an opposite second lower surface 422'. A second optical fiber 432' is secured within a second optional parallel vee-groove 426' on second upper surface 424', between the second optically transmissive substrate 420' and the second connector housing 410'. The second connector housing 410' further includes an optional second cover support 415', and an optional second cover 417' that can serve to protect the components in the second optical connector 400'.

Second optical fiber 432' includes a second light re-directing feature 435' including a second cleaved end 436' of second optical fiber 432'. Second optical fiber 432' can be held in position and aligned by resting in the second optional parallel vee-groove 426', which can be directly molded into second optically transmissive substrate 420'. Second optical fiber 432' can be in direct contact with second upper surface 424' such that second gap 434' is eliminated. In some cases, an adhesive can be used to affix the second optical fiber 432' to the second optional parallel vee-groove 426' and an index-matching adhesive or gel can fill the second gap 434', if present.

Second optically transmissive substrate 420' further includes a second microlens 428' disposed on the second lower surface 422', positioned such that a central light ray 490 travelling through the second optical fiber 432' that intercepts and is reflected from the second cleaved end 436', is directed toward the optical center of the second microlens 428'. In one particular embodiment, shown in FIG. 4, second cleaved end 436' can be disposed such that central light ray 490 intercepts second cleaved end 436' at a reflection angle θr equal to about 45 degrees. In some cases, second cleaved end 436' can be a TIR surface. In some cases, second cleaved end 436' can instead be a mirrored reflective surface.

A first and a second alignment feature 450, 450' in first and second connector housing 410, 410', respectively, serve to ensure that light from the first optical fiber 432 and the second optical fiber 432' are coupled efficiently, with a minimum of losses. First and second alignment features 450, 450' can include any suitable feature to ensure alignment of the first and second optical connectors 400, 400', and the features shown in FIG. 4 are for illustrative purposes only.

A first optical fiber separation distance S1 can be measured between the optical axis of the first optical fiber 432 and the first microlens 428. A second optical fiber separation distance S1' can be measured between the optical axis of the second optical fiber 423' and the second microlens 428'. A microlens separation distance S2 can be measured between the surfaces of the first and second microlenses 428, 428'. In some cases, each of the first optical fiber separation distance S1 and the second optical fiber separation distance S1' will be the same, and can range from about 1 mm to about 2 mm, or about 1.5 mm. The microlens separation distance S2 can range from about 0.1 mm to about 1 mm, or about 0.5 mm.

A light beam 490 travelling through first optical fiber 432 is reflected from first cleaved end 436 in a direction perpendicular to the optical axis of first optical fiber 432. Light beam 490 then passes through first microlens 428 which can be a collimating microlens or a focusing microlens, as described elsewhere. Light beam 490 then enters second optically transmissive substrate 420' through second microlens 428', is reflected from second cleaved end 436' and enters second optical fiber 432' in a direction parallel to the optical axis of the second optical fiber 432'.

Figure 5A:
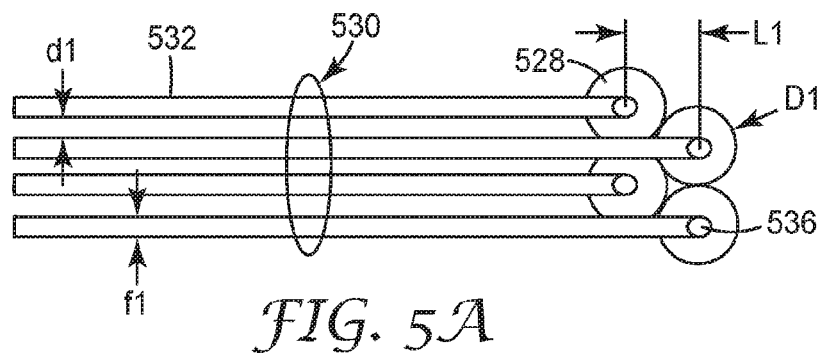
FIGS. 5A-5C show schematic views of optical fiber and microlens positioning.
Figure 5B:
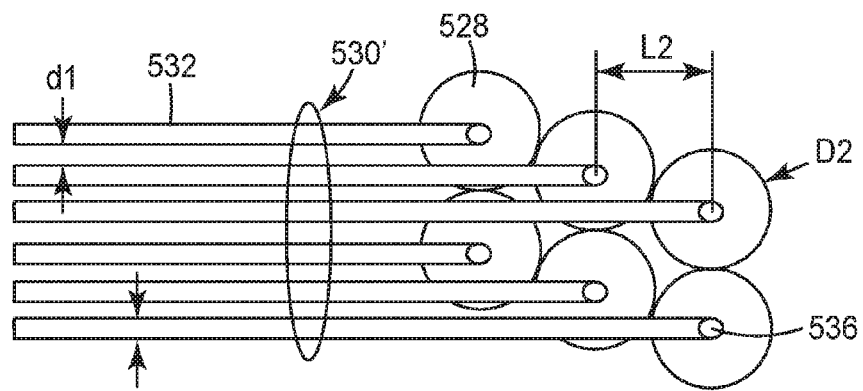
Figure 5C:
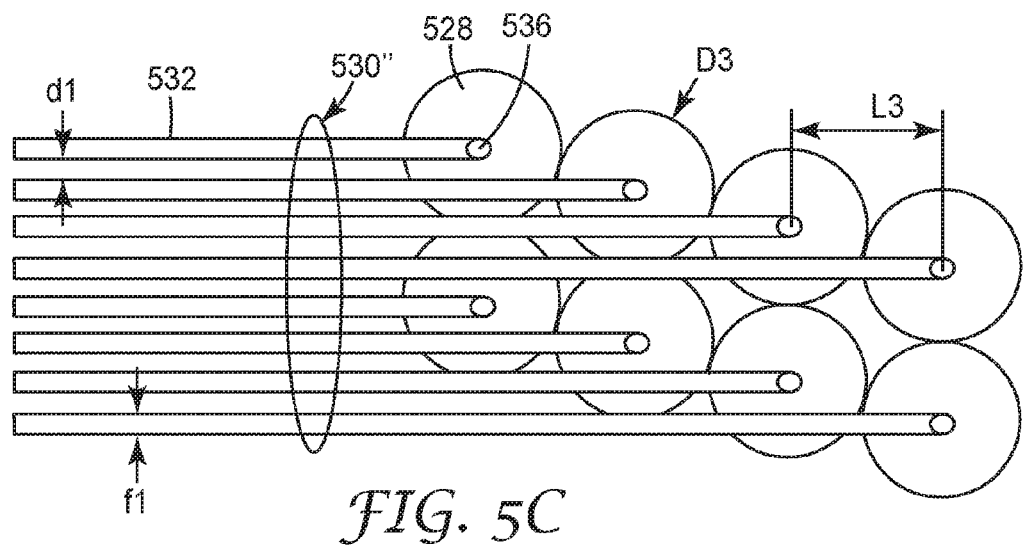

FIGS. 5A-5C show schematic views of optical fiber and microlens positioning, according to one aspect of the disclosure. In FIG. 5A, each of the optical fibers 532 in ribbon cable 530 have an uncoated fiber diameter fl equal to about 125 microns, and a fiber-to-fiber spacing dl equal to about 125 microns. In one particular embodiment, for two rows of microlenses 528 shown in the figure, the staggered cleaved ends 536 of optical fibers 532 can be separated by a fiber length difference L1 equal to about 433 microns, and the maximum diameter D1 of the microlenses 528 can be about 500 microns.

In FIG. 5B, each of the optical fibers 532 in ribbon cable 530' have an uncoated fiber diameter fl equal to about 125 microns, and a fiber-to-fiber spacing dl equal to about 125 microns. In one particular embodiment, for three rows of microlenses 528 shown in the figure, the staggered cleaved ends 536 of optical fibers 532 can be separated by a fiber length difference L2 equal to about 707 microns, and the maximum diameter D2 of the microlenses 528 can be about 750 microns.

In FIG. 5C, each of the optical fibers 532 in ribbon cable 530" have an uncoated fiber diameter fl equal to about 125 microns, and a fiber-to-fiber spacing dl equal to about 125 microns. In one particular embodiment, for four rows of microlenses 528 shown in the figure, the staggered cleaved ends 536 of optical fibers 532 can be separated by a fiber length difference L3 equal to about 968 microns, and the maximum diameter D3 of the microlenses 528 can be about 1000 microns.

Figure 6:
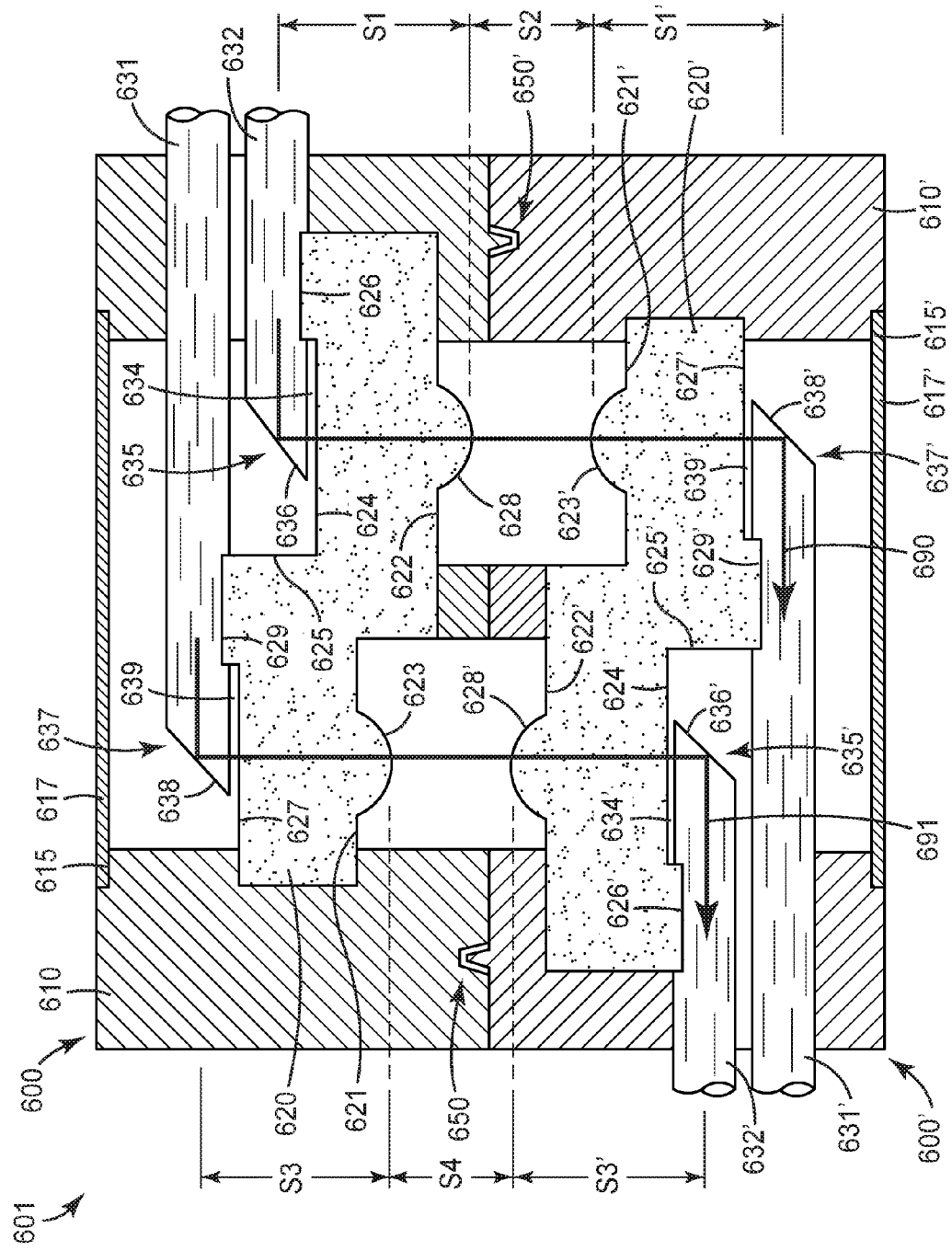
FIG. 6 shows a cross-sectional schematic view of an optical connection.

FIG. 6 shows a cross-sectional schematic view of an optical connection 601 that includes a first optical connector 600 connected to a second optical connector 600', according to one aspect of the disclosure. In FIG. 6, the cross-sectional view is near the optical axis (that is, center) of two pairs of optical fibers in communication through the connector. In one particular embodiment, second optical connector 600' can be identical to the first optical connector 600, and forms an optical connection 601, similar to the optical connection 101 shown in FIG. 1B. In some cases, second optical connector 600' can instead be a mirror image to the first optical connector 600.

First optical connector 600 includes a first connector housing 610 and a first optically transmissive substrate 620 secured within the first connector housing 610. The first optically transmissive substrate 620 comprises a staircase that includes a first floor surface 624, a first step 625, and a first tread 627. The first optically transmissive substrate 620 further comprises a second floor surface 622 opposite the first floor surface 624 and a second tread 621 opposite the first tread 627. A first optical fiber 632 is secured within a first optional parallel vee-groove 626 on first floor surface 624, between the first optically transmissive substrate 620 and the first connector housing 610. A second optical fiber 631 is secured within a second optional parallel vee-groove 629 on the first tread 627, and is also secured within first connector housing 610. The first connector housing 610 further includes an optional first cover support 615, and an optional first cover 617 that can serve to protect the components in the first optical connector 600.

First optical fiber 632 includes a first light re-directing feature 635 including a first cleaved end 636 of first optical fiber 632. First optical fiber 632 can be held in position and aligned by resting in the first optional parallel vee-groove 626, which can be directly molded into first optically transmissive substrate 620. First optical fiber 632 can be in direct contact with first floor surface 624 such that first gap 634 is eliminated. In some cases, an adhesive can be used to affix the first optical fiber 632 to the first optional parallel vee-groove 626 and an index-matching adhesive or gel can fill the first gap 634, if present.

Second optical fiber 631 includes a second light re-directing feature 637 including a second cleaved end 638 of second optical fiber 631. Second optical fiber 631 can be held in position and aligned by resting in the second optional parallel vee-groove 629, which can be directly molded into first optically transmissive substrate 620. Second optical fiber 631 can be in direct contact with first tread 627 such that second gap 639 is eliminated. In some cases, an adhesive can be used to affix the second optical fiber 631 to the second optional parallel vee-groove 629 and an index-matching adhesive or gel can fill the second gap 639, if present.

First optically transmissive substrate 620 further includes a first microlens 628 disposed on the second floor surface 622, positioned such that a light ray travelling through the first optical fiber 632 that intercepts and is reflected from the first cleaved end 636, is directed toward the optical center of the first microlens 628. First optically transmissive substrate 620 still further includes a second microlens 623 disposed on the second tread 621, positioned such that a light ray travelling through the second optical fiber 631 that intercepts and is reflected from the second cleaved end 638, is directed toward the optical center of the second microlens 623.

In a similar manner, second optical connector 600' includes a second connector housing 610' and a second optically transmissive substrate 620' secured within the second connector housing 610'. The second optically transmissive substrate 620' comprises a staircase that includes a third floor surface 624', a second step 625', and a third tread 627'. The second optically transmissive substrate 620' further comprises a fourth floor surface 622' opposite the third floor surface 624' and a fourth tread 621' opposite the third tread 627'. A third optical fiber 632' is secured within a third optional parallel vee-groove 626' on third floor surface 624', between the second optically transmissive substrate 620' and the second connector housing 610'. A fourth optical fiber 631' is secured within a fourth optional parallel vee-groove 629' on the third tread 627', and is also secured within second connector housing 610'. The second connector housing 610' further includes an optional second cover support 615', and an optional second cover 617' that can serve to protect the components in the second optical connector 600'.

Third optical fiber 632' includes a third light re-directing feature 635' including a third cleaved end 636' of third optical fiber 632'. Third optical fiber 632' can be held in position and aligned by resting in the third optional parallel vee-groove 626', which can be directly molded into second optically transmissive substrate 620'. Third optical fiber 632' can be in direct contact with third floor surface 624' such that third gap 634' is eliminated. In some cases, an adhesive can be used to affix the third optical fiber 632' to the third optional parallel vee-groove 626' and an index-matching adhesive or gel can fill the third gap 634', if present.

Fourth optical fiber 631' includes a fourth light re-directing feature 637' including a fourth cleaved end 638' of fourth optical fiber 631'. Fourth optical fiber 631' can be held in position and aligned by resting in the fourth optional parallel vee-groove 629', which can be directly molded into second optically transmissive substrate 620'. Fourth optical fiber 631' can be in direct contact with third tread 627' such that fourth gap 639' is eliminated. In some cases, an adhesive can be used to affix the fourth optical fiber 631' to the fourth optional parallel vee-groove 629' and an index-matching adhesive or gel can fill the fourth gap 639', if present.

Second optically transmissive substrate 620' further includes a third microlens 628' disposed on the fourth floor surface 622', positioned such that a light ray travelling through the third optical fiber 632' that intercepts and is reflected from the third cleaved end 636', is directed toward the optical center of the third microlens 628'. Second optically transmissive substrate 620' still further includes a fourth microlens 623' disposed on the fourth tread 621', positioned such that a light ray travelling through the fourth optical fiber 631' that intercepts and is reflected from the fourth cleaved end 638', is directed toward the optical center of the fourth microlens 623'.

A first and a second alignment feature 650, 650' in first and second connector housing 610, 610', respectively, serve to ensure that light from the first optical fiber 632 and the fourth optical fiber 431' are coupled efficiently, and also that light from the second optical fiber 631 and the third optical fiber 632' are coupled efficiently, with a minimum of losses. First and second alignment features 650, 650' can include any suitable feature to ensure alignment of the first and second optical connectors 600, 600', and the features shown in FIG. 6 are for illustrative purposes only.

A first optical fiber separation distance S1 can be measured between the optical axis of the first optical fiber 632 and the first microlens 628. A second optical fiber separation distance S1' can be measured between the optical axis of the fourth optical fiber 631' and the fourth microlens 623'. A first microlens separation distance S2 can be measured between the surfaces of the first and fourth microlenses 628, 623'.

Similarly, a third optical fiber separation distance S3 can be measured between the optical axis of the second optical fiber 631 and the second microlens 623. A fourth optical fiber separation distance S3' can be measured between the optical axis of the third optical fiber 632' and the third microlens 628'. A second microlens separation distance S4 can be measured between the surfaces of the second and third microlenses 623, 628'.

In some cases, each of the first through fourth optical fiber separation distances S1, S1', S3, S3', can be the same, and can range from about 1 mm to about 2 mm, or about 1.5 mm. In some cases, each of the first and second microlens separation distance S2, S4, can be the same, and can range from about 0.1 mm to about 1 mm, or about 0.5 mm. In one particular embodiment, each of the connection path lengths through the connector can be the same, such that the first-fourth optical fiber path length S1+S2+S1' is equal to the second-third optical fiber path length S3+S4+S3'.

A first light beam 690 travelling through first optical fiber 632 is reflected from first cleaved end 636 in a direction perpendicular to the optical axis of first optical fiber 632. First light beam 690 then passes through first microlens 628 which can be a collimating microlens or a focusing microlens, as described elsewhere. First light beam 690 then enters second optically transmissive substrate 620' through fourth microlens 623', is reflected from fourth cleaved end 638' and enters fourth optical fiber 631' in a direction parallel to the optical axis of the fourth optical fiber 631'.

In a similar manner, a second light beam 691 travelling through second optical fiber 631 is reflected from second cleaved end 638 in a direction perpendicular to the optical axis of second optical fiber 631. Second light beam 691 then passes through second microlens 623 which can be a collimating microlens or a focusing microlens, as described elsewhere. Second light beam 691 then enters second optically transmissive substrate 620' through third microlens 628', is reflected from third cleaved end 636' and enters third optical fiber 632' in a direction parallel to the optical axis of the third optical fiber 632'.

In one particular embodiment, an antireflective (AR) coating can be applied to portions of the optically transmissive substrate, the optical fiber, or to both the optically transmissive substrate and the optical fiber, in order to further reduce reflective (that is, Fresnel) losses. In some cases, an AR coating can be applied in the region proximate each of the gaps between the optical fiber and the optically transmissive substrate (for example, the first through fourth gaps 634, 639, 634', 639'). In some cases, an AR coating can also be applied to the surface of the microlenses. In one particular embodiment, an index matching gel or an index matching adhesive can be disposed in the region surrounding the gaps between the optically transmissive substrate and the optical fiber, also to reduce reflective losses.

Following are a list of embodiments of the present disclosure.

Item 1 is an optical construction comprising: an optically transmissive substrate comprising: a first major surface comprising a plurality of waveguide alignment features; an opposing second major surface comprising a plurality of microlenses staggered relative to one another; and a plurality of optical waveguides with angle cleaved end faces disposed adjacent the first major surface, the angle cleaved end faces being staggered relative to one another, each angle cleaved end face of an optical waveguide in the plurality of optical waveguides corresponding to a different microlens and being oriented so that light exiting each optical waveguide is directed by the angle cleaved end face to the corresponding microlens through the substrate.

Item 2 is the optical construction of item 1, wherein the waveguide alignment features comprise parallel grooves.

Item 3 is the optical construction of item 1 or item 2, wherein the optical waveguides comprise optical fibers.

Item 4 is the optical construction of item 1 to item 3, wherein the staggered microlenses form spaced apart first and second rows of microlenses and the staggered angle cleaved end faces form spaced apart first and second rows of angle cleaved end faces.

Item 5 is the optical construction of item 1 to item 4, wherein each of the angle cleaved end faces comprise a total internal reflection (TIR) surface.

Item 6 is the optical construction of item 1 to item 5, wherein each of the angle cleaved end faces comprise a reflective material coating.

Item 7 is the optical construction of item 6, wherein the reflective material coating comprises a metal or a metal alloy.

Item 8 is the optical construction of item 1 to item 7, wherein each microlens includes a diameter greater than a separation distance between adjacent optical waveguides.

Item 9 is the optical construction of item 1 to item 8, further comprising an antireflective coating disposed on each microlens.

Item 10 is an optical construction comprising: a first major surface comprising a first plurality of waveguide alignment features; a first plurality of optical waveguides with angle cleaved end faces disposed adjacent the first major surface, the angle cleaved end faces being staggered relative to one another; a second major surface opposite the first major surface and comprising a second plurality of waveguide alignment features; and a second plurality of optical waveguides with angle cleaved end faces disposed adjacent the second major surface, the angle cleaved end faces being staggered relative to one another; wherein each optical waveguide in the first plurality of optical waveguides corresponds to a different optical waveguide in the second plurality of optical waveguides, the angle cleaved faces of corresponding optical waveguides being so oriented that light exiting one optical waveguide enters the corresponding optical waveguide.

Item 11 is the optical construction of item 10, wherein the waveguide alignment features comprise parallel grooves.

Item 12 is the optical construction of item 10 or item 11, wherein the optical waveguides comprise optical fibers.

Item 13 is the optical construction of item 10 to item 12, wherein corresponding optical waveguides are associated with one or more corresponding microlenses for directing light between the angle cleaved end faces of the corresponding optical waveguides.

Item 14 is the optical construction of item 10 to item 13, wherein the staggered angle cleaved end faces of each of the first and second pluralities of optical waveguides form spaced apart first and second rows of angle cleaved end faces.

Item 15 is the optical construction of item 10 to item 14, wherein each of the angle cleaved end faces comprise a total internal reflection (TIR) surface.

Item 16 is the optical construction of item 10 to item 15, wherein each of the angle cleaved end faces comprise a reflective material coating.

Item 17 is the optical construction of item 16, wherein the reflective material coating comprises a metal or a metal alloy.

Item 18 is the optical construction of item 10 to item 17, wherein each microlens includes a microlens diameter greater than a separation distance between adjacent optical waveguides.

Item 19 is the optical construction of item 10 to item 18, further comprising an antireflective coating disposed on each microlens.

Item 20 is an optical construction, comprising: an optically transmissive substrate comprising: a first major side comprising a first floor surface; a first staircase formed on the first floor surface and comprising at least a first step comprising a first tread; a second major side opposite the first major side and comprising a second floor surface; a second staircase formed on the second floor surface and comprising at least a first step comprising a first tread; a first plurality of staggered microlenses disposed on the second floor surface and forming rows of microlenses; a second plurality of staggered microlenses disposed on the first tread of the second staircase and forming rows of microlenses, wherein the substrate, the first and second staircases and the microlenses form a unitary construction; a first plurality of optical waveguides with angle cleaved end faces disposed on the first floor surface, the angle cleaved end faces being staggered relative to one another; and a second plurality of optical waveguides with angle cleaved end faces disposed on the first tread of the first staircase, the angle cleaved end faces being staggered relative to one another, wherein each angle cleaved end face of an optical waveguide in the first and the second plurality of optical waveguides corresponds to a different microlens so that light exiting each optical waveguide is directed by the angle cleaved end face to the corresponding microlens through the substrate.

Item 21 is the optical construction of item 20, wherein the waveguide alignment features comprise parallel grooves.

Item 22 is the optical construction of item 20 or item 21, wherein the optical waveguides comprise optical fibers.

Item 23 is the optical construction of item 20 to item 22, wherein a separation distance between each angle cleaved end face of the optical waveguide and the corresponding microlens is a constant.

Item 24 is the optical construction of item 20 to item 23, wherein each of the angle cleaved end faces comprise a total internal reflection (TIR) surface.

Item 25 is the optical construction of item 20 to item 24, wherein each of the angle cleaved end faces comprise a reflective material coating.

Item 26 is the optical construction of item 25, wherein the reflective material coating comprises a metal or a metal alloy.

Item 27 is the optical construction of item 20 to item 26, further comprising an antireflective coating disposed on the microlenses.

Item 28 is an optical connector comprising the optical construction of item 1 to item 27.

Item 29 is a transceiver comprising the optical construction of item 1 to item 28.

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical construction comprising:
   a plurality of optical fibers with angle cleaved end faces;
   an optically transmissive substrate comprising a first major surface; and
   a plurality of microlenses on a second major surface of the optically transmissive substrate opposite the first major surface,
   wherein the plurality of optical fibers is disposed in a same plane on the first major surface such that the angle cleaved end faces are staggered relative to one another.

2. The optical construction of claim 1, wherein the first major surface comprises a plurality of waveguide alignment features, and each optical fiber in the plurality of optical fibers is received by a different waveguide alignment feature in the plurality of waveguide alignment features.

3. The optical construction of claim 1, wherein the microlenses are staggered relative to one another.

4. The optical construction of claim 1, wherein the angle cleaved end face of each optical fiber in the plurality of optical fibers corresponds to and is aligned with a different microlens.

5. The optical construction of claim 4, wherein the angle cleaved end face of each optical fiber in the plurality of optical fibers is oriented so that light exiting each optical fiber is directed by the angle cleaved end face to the corresponding microlens through the substrate.

6. The optical construction of claim 4, wherein the angle cleaved end face of each optical fiber in the plurality of optical fibers is oriented so that a central light ray traveling through the optical fiber is reflected from the angle cleaved end face toward an optical center of the corresponding microlens.

7. The optical construction of claim 1, wherein the second major surface defines a recessed area, the recessed area comprising the plurality of microlenses.

8. The optical construction of claim 7, wherein each microlens in the plurality of microlenses has an apex disposed within a volume defined by the recessed area.

9. The optical construction of claim 1, wherein the plurality of microlenses form spaced apart first and second rows of microlenses and the angle cleaved end faces form spaced apart first and second rows of angle cleaved end faces.

10. The optical construction of claim 1, wherein each microlens has a diameter greater than a separation distance between adjacent optical fibers.

11. The optical construction of claim 1, further comprising an antireflective coating disposed on each microlens.

12. The optical construction of claim 1, wherein a ribbon cable comprises the optical fibers.

13. The optical construction of claim 1, wherein each of the angle cleaved end faces comprise a total internal reflection (TIR) surface.

14. The optical construction of claim 1, wherein each of the angle cleaved end faces comprise a reflective material coating.

15. The optical construction of claim 1, wherein the first major surface comprises a first plurality of waveguide alignment features ending along a first row and a second plurality of waveguide alignment features ending along a different second row, the first and second rows being parallel to each other, each optical fiber in the plurality of optical fibers being received by a different waveguide alignment feature in the first or second plurality of waveguide alignment features.

16. The optical construction of claim 1, wherein the angle cleaved end faces comprise a first plurality of end faces disposed along a first row and a second plurality of end faces disposed along a second row, the first and second rows spaced apart from one another.

17. The optical construction of claim 16, wherein the first major surface comprises a raised portion, the first plurality of end faces disposed in recessed areas defined by the raised portion.

18. The optical construction of claim 17, wherein the second major surface comprises a recessed area, the recessed area comprising the plurality of microlenses, the angle cleaved end face of each optical fiber in the plurality of optical fibers corresponding to and being aligned with a different microlens in the plurality of microlenses.

19. The optical construction of claim 18, wherein a ribbon cable comprises the plurality of optical fibers, the plurality of optical fibers having a fiber-to-fiber separation in the ribbon cable, each microlens being configured such that an optical beam diameter of light exiting the microlens is greater than the fiber-to-fiber separation.

* * * * *